UNITED STATES PATENT OFFICE.

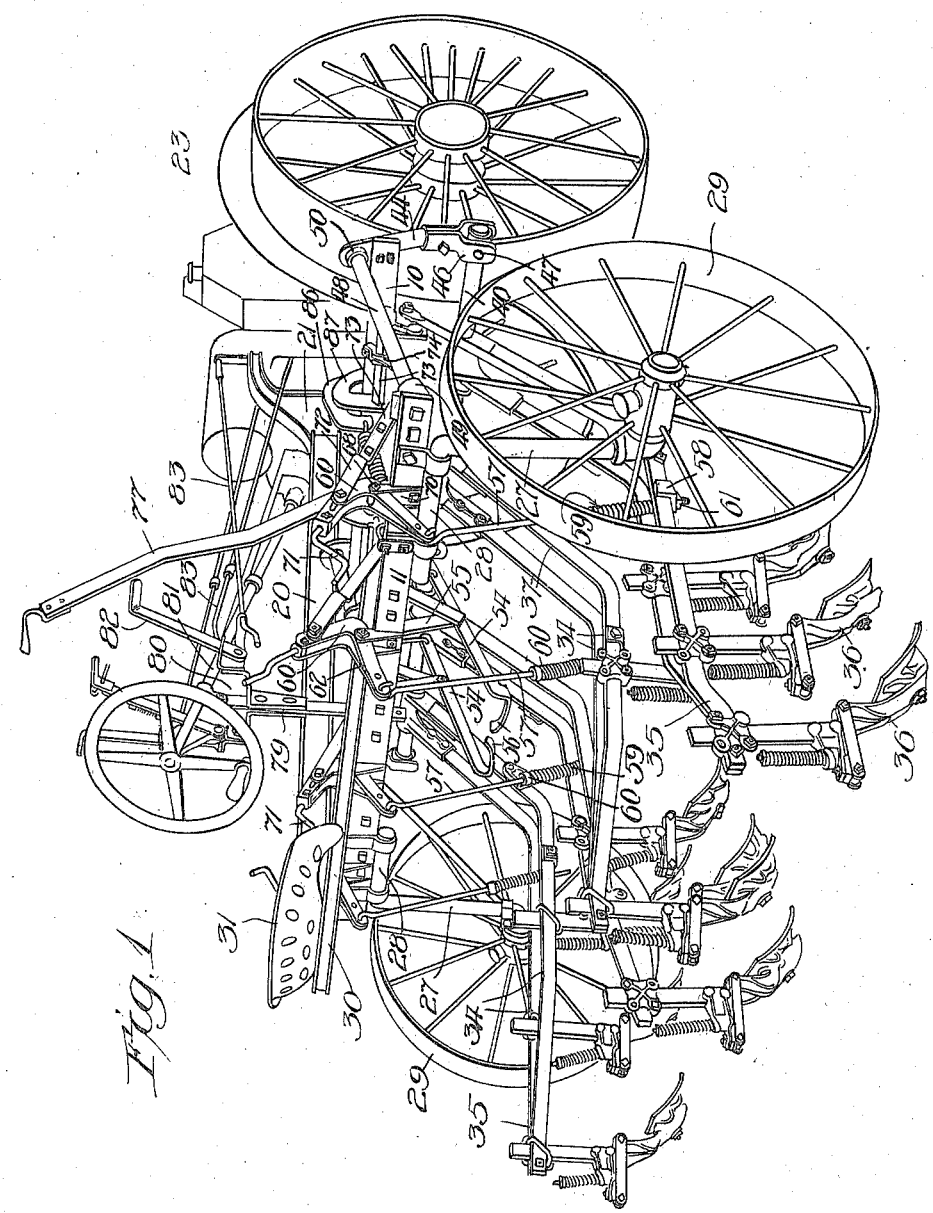

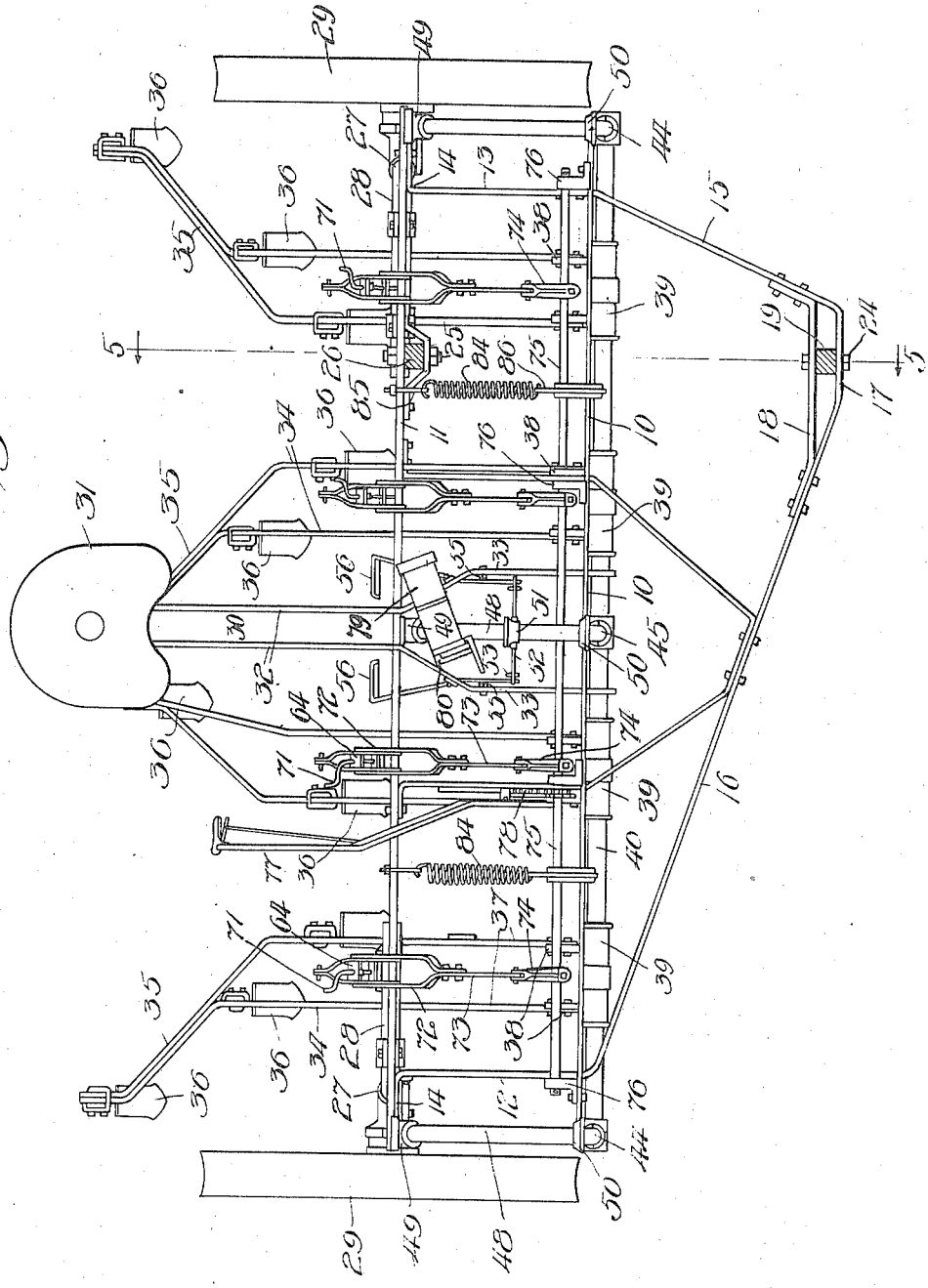

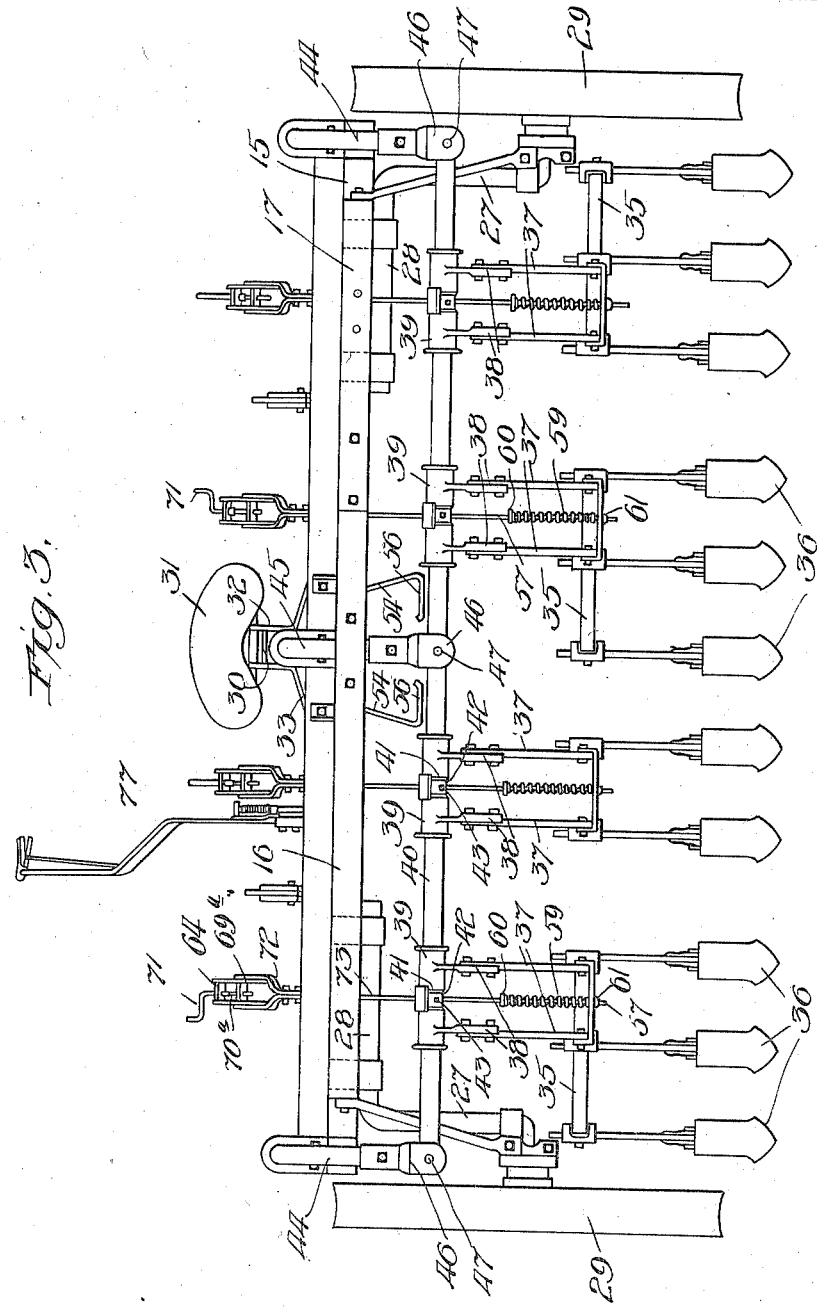

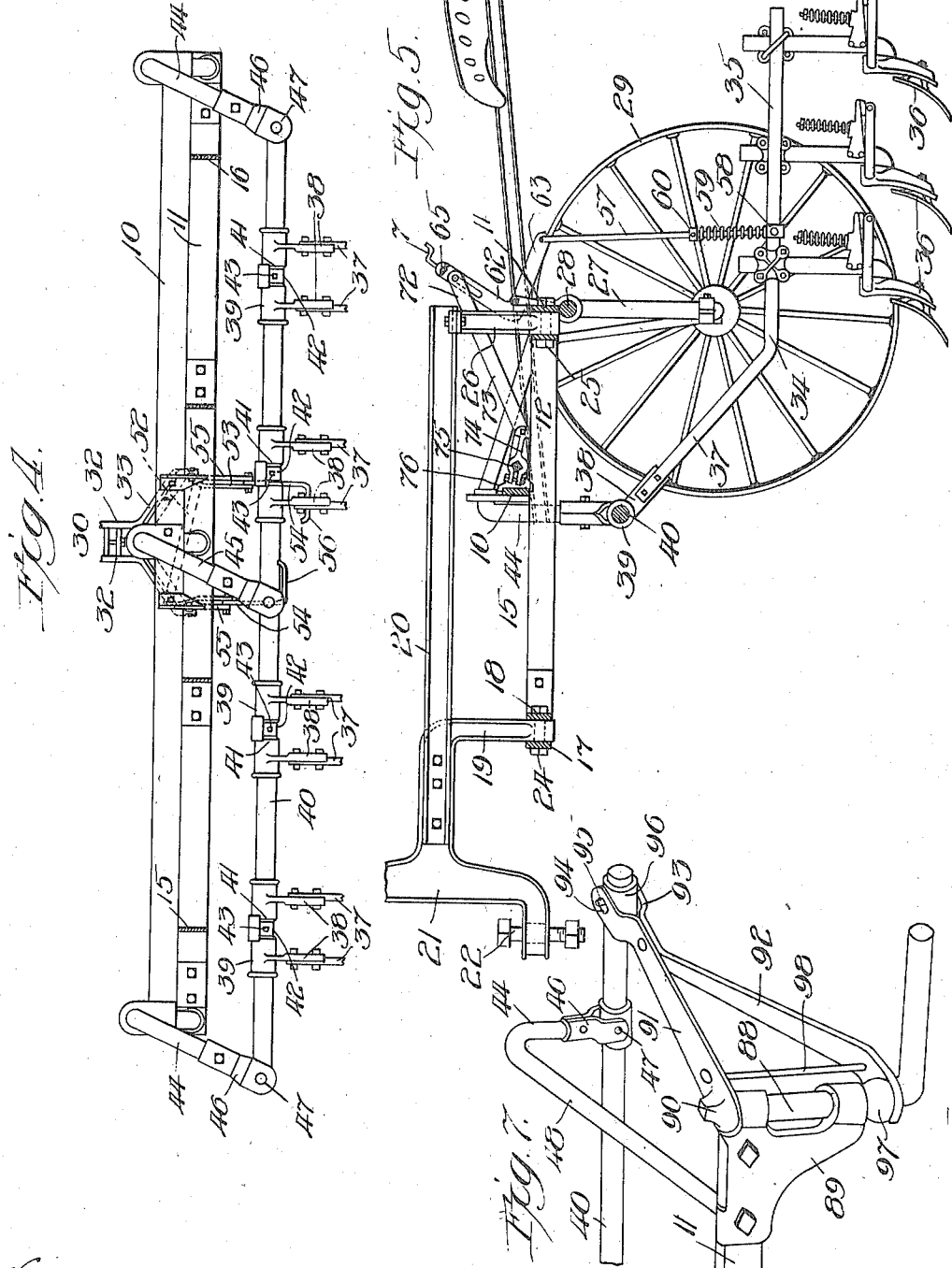

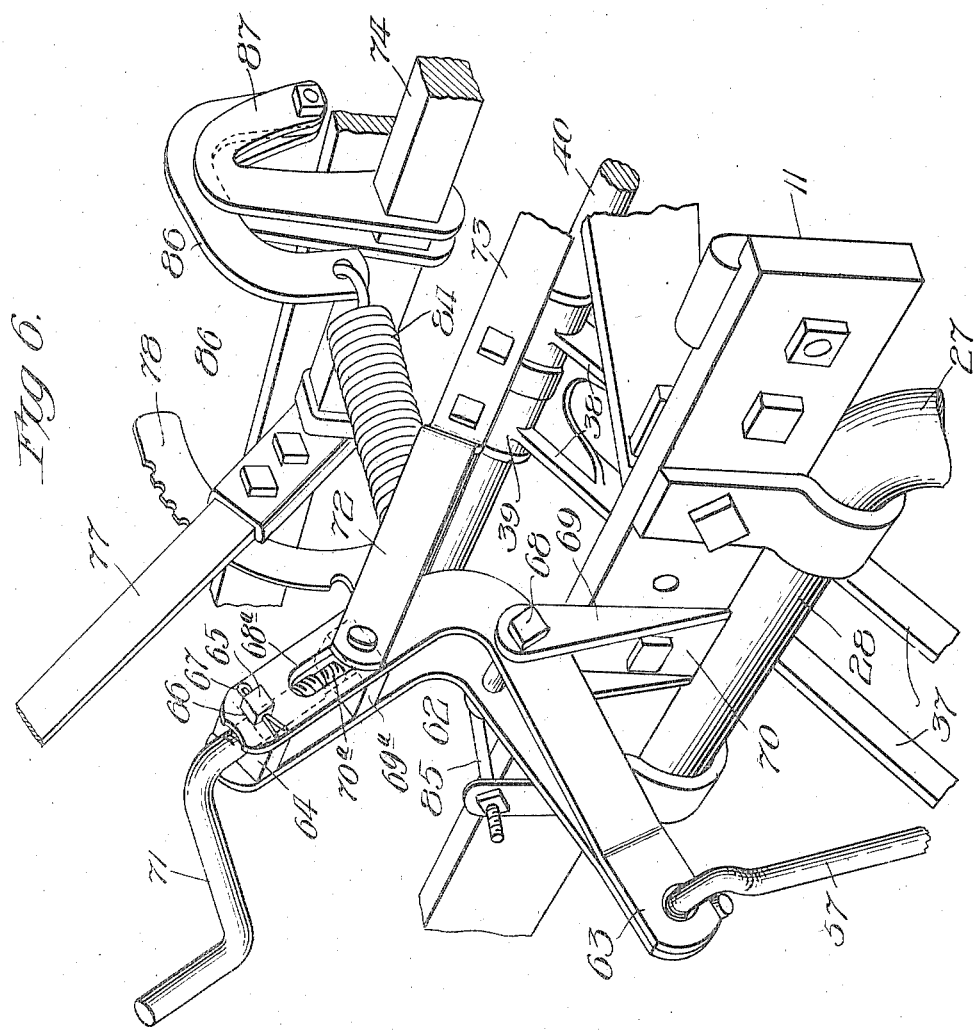

HARRY S. DICKINSON, OF MOLINE, ILLINOIS, ASSIGNOR TO MOLINE PLOW COMPANY, OF MOLINE, ILLINOIS, A CORPORATION OF ILLINOIS.

CULTIVATOR.

1,286,557.  Specification of Letters Patent.  Patented Dec. 3, 1918.

Application filed July 14, 1917. Serial No. 180,558.

*To all whom it may concern:*

Be it known that I, HARRY S. DICKINSON, a citizen of the United States, residing at Moline, in the county of Rock Island and State of Illinois, have invented certain new and useful Improvements in Cultivators, of which the following is a specification.

The cultivator of the present invention is designed primarily, although not exclusively, for use in association with a two-wheeled tractor of the unstable type which relies for its rear support upon the trailing implement with which it is associated. In an association of this kind, it is necessary to provide connections between the tractor and the trailing implement of such a character as to resist vertical thrust, and at the same time afford flexibility in a horizontal direction in order to provide for the steering of the combined implement.

The cultivator of the present invention is specially designed for use in such association, although equally well adapted, with slight modifications, to subserve the purposes of a horse-drawn implement.

Where a tractor is used as the motive power, it is necessary that the tractor be light enough to prevent undue packing of the ground, and at the same time be able to transport itself over newly plowed fields. In use the cultivator is required to cultivate the ground between rows which are ordinarily spaced rather close together, usually three feet four inches apart to three feet ten inches apart. The wheel tread of the tractor must be such as to successfully operate within the limits set by the width of the rows, and the cultivation must be continued until the crops have attained such a degree of maturity that cultivation may be discontinued. This last circumstance requires provision of considerable clearance beneath the tractor and cultivator, and these requirements must be met in a combined implement in which the cultivator itself is relied upon as a factor in the steering and guiding of the structure as a whole.

The cultivator of the present invention is designed to simultaneously cultivate at least two rows, and in thus operating, it is necessary that the tractor straddle one of the rows, and that the operator be seated in such position that his line of vision will not be obstructed by the tractor in order that he may guide and control the cultivating operations and maintain the implement in its proper line of travel.

The present invention is designed to meet all of the requirements above outlined and at the same time to make adequate provision for the quick and easy lateral adjustments of the gang frames which carry the cultivating shovels in order to properly aline the shovels to cultivate the soil in the vicinity of a hill which is slightly out of check when such imperfectly spaced hills are encountered.

The invention is also directed to the means provided for automatically leveling or equalizing the height of all of the gangs when in lifted position irrespective of individual vertical adjustment of the gangs when in lowered position which is important in that it insures an adequate clearance between the shovels and the ground when the gangs are raised irrespective of the independent individual adjustments of the shovels when in lowered or cultivating position.

The invention is also directed to the means afforded for providing a pivotal connection with the rearwardly extending beam which unites the cultivator with the associated tractor, and to the general construction and arrangement of the cultivator as a whole, and to its association with the tractor.

In the drawings illustrating the invention:

Figure 1 is a perspective view of the cultivator and tractor taken from points slightly to the rear and at one side of the cultivator;

Fig. 2 is a top or plan view of the cultivator.

Fig. 3 is a front elevation of the same showing the gangs in the normal position of adjustment;

Fig. 4 is a fragmentary view showing the gangs swung laterally in position to cultivate hills which are out of check;

Fig. 5 is a section through line 5—5 of Fig. 2;

Fig. 6 is an enlarged perspective detail of the adjusting and leveling mechanism for one of the gangs; and Fig. 7 is a view showing certain connections which are employed for swiveling the ground wheels where the cultivator is employed as a horse-drawn implement.

The cultivator of the present invention, in its general arrangement, resembles an ordinary two row cultivator. The working parts are carried by the frame comprising a front rail 10, a rear rail 11, and end rails 12 and 13. This gives to the frame a rectangular shape and provides the necessary support for the operating elements presently to be described. The end rails 12 and 13, at their rear ends, terminate in angular extensions 14, which are bolted or otherwise rigidly connected to the rear rail 11, and the end rails in front are continued to afford a front extension comprising converting rails 15 and 16, the former of which is considerably shorter than the latter, with the result that the apex 17 of the front extension will occupy a position considerably to the left of the center of the cultivator as viewed from the rear to the front.

Inside of the apex of the extension is located a cross bar 18 which gives to the structure the form of a double bridge, and affords a space for the reception of a front hanger 19 which depends from and is rigidly secured to a rearwardly extending tractor beam 20 which is carried by and rearwardly extends from a yoke 21 pivoted by vertical pivots 22 to the frame of a tractor 23. The tractor beam is mounted to afford freedom of movement in a horizontal direction which is necessary in steering the combined implement, but the pivotal connections for the beam are resistant against vertical thrust, so that, with the cultivator attached, the combined implement will have the characteristics of a unitary structure which may be steered and controlled from the driver's seat at the rear of the cultivator. The specific details of the tractor or power unit form no part of the present invention, and further description of these features is deemed unnecessary.

The front hanger 19 is pivoted within the space between the members 17 and 18 by means of a longitudinally extending forward pivot 24 coöperating with an alined rear pivot 25 which passes through the end of a rear hanger 26 depending from the tractor beam, which arrangement affords a connection between the tractor beam and the cultivator of a nature to resist heavy vertical thrust and at the same time permit a tilting or rocking of the cultivator upon the alined pivots which is necessary in order to afford sufficient flexibility to meet ground conditions without impairing the steering and controlling of the combined implement as a whole.

The rectangular frame affords a mounting for a pair of vertically disposed wheel supports 27, each of which, at its upper end, terminates in an inward extension 28 which is rigidly connected with the rear bar 11 of the frame structure, and at its lower end terminates in the usual outwardly projecting axle, not shown, upon which the associated ground wheel 29 is journaled. These details are common to cultivators of this general structure, and need not be further described.

The frame also affords a mounting for the rearwardly extending seat beam 30 which carries a seat 31 located to the rear of the frame and in the transverse center thereof, but, in view of the fact that the tractor is connected to the cultivator frame at a point to one side of the center, it is obvious that the cultivator will trail the tractor to one side thereof, so that the driver on the seat will have practically an unimpeded view ahead of one of the rows under cultivation which will enable him to steer and control the implement in order to bring the cultivating shovels into proper relation with the growing crop.

The seat beam 30 is composed of a pair of companion bars 32, which are suitably supported by the rear rail 11 of the frame, and are continued in the form of extensions 33 outwardly offset with respect to the beam proper, which extensions in turn are suitably connected to the forward frame rail 10, and thus help to reinforce the frame in its center and at the same time afford a firm support adapted to resist the weight of the driver on the seat.

As shown, the cultivator gangs are four in number and each gang comprises companion drag bars 34 which merge together at their rear ends 35. Each companion drag bar affords a mounting for a series of cultivating shovels 36 which are set in the customary angular relation with one another to cultivate the soil on both sides of two rows of growing plants.

The details of the shovel mountings and shovels do not constitute essential parts of the present invention, since any usual and well known connections or mountings may be employed for holding the shovels in proper relation with one another.

The forward end 37 of the companion drag bars for each gang are obliquely extended in an upward direction, and are connected to a pair of rearwardly extending ears 38 which project downwardly and backwardly from a sleeve 39 mounted upon a cross gang bar 40 which is located below and slightly to the front of and in parallelism with the front frame bar.

Each of the gang sleeves 39 is partially cut away in its center to afford a recess 41 for the reception of a collar 42 which is slidably held on the cross gang bar and in properly adjusted relation thereon by means of a set-screw 43, which arrangement permits the several gangs to be suitably adjusted in spaced arrangement with respect to one another to accommodate the spacing of the rows which it is intended to cultivate.

In order to provide for a quick and easy adjustment of the four gangs as a unit, which is necessary to accommodate the implement to rows that are occasionally out of check, a special mounting has been provided for the cross gang bar which will now be described. This mounting is afforded by the provision of oscillating end hangers 44 and a center hanger 45, which hangers, at their lower ends, are provided with bifurcated pivot heads 46 which embrace the cross gang bar and are pivoted thereto by means of pivots 47. Each of the hangers, at its upper end is bent or turned to provide a rearward extension 48, the rear end of which is socketed into a fitting 49 attached to the rear frame bar 11, which socket fitting coöperates with an alined bearing 50 upstanding from the front frame rail and affording, in combination with the companion rear socket, a longitudinal mounting for the rocking of the hanger extensions which gives to the hangers themselves a pendulum movement and permits the cross gang bar, with the entire series of gangs carried thereby, to be swung laterally from the position shown in Fig. 3 into the position shown in Fig. 4, as occasion may require.

In order to control the lateral adjustment of the gangs, the center extension 48 has rigidly mounted thereon a collar 51 from which extend a pair of arms 52 which are connected by links 53 with the forward ends of a pair of foot levers 54, each of which is pivoted in its center to the lower end of a short bracket 55 hung from the adjacent extension of the seat beam 33, as indicated in Figs. 1 and 2.

The foot levers, at their rear ends, terminate in inturned foot treadles 56 within convenient distance of the seat, so that the driver, by depressing either of the foot treadles at will, can impart a thrust to one or the other of the laterally projecting arms 52, and thereby rock the center extension 48, with the result that a swinging or pendulum motion will be imparted through the center hanger 45 to the gang bar, causing the latter to be swung either to the right or left, as may be desired.

Although it may be desirable to adjust the gangs individually to different depths when in lowered or cultivating position, nevertheless it is desirable to level up all the gangs when in elevated position in order to afford the proper amount of clearance when the cultivator is passing idly through a field or on a road, and the leveling mechanism for the gang mountings will now be described. This mechanism is shown in enlarged detail in Fig. 5. Each of the drag bars is supported and adjusted through the medium of a pressure rod 57, the lower end of which is slidably mounted in a clip 58 secured to one of the companion members of the underlying drag bar. The parts are held in resilient relation by the provision of a coil spring 59 which surrounds the rod and which bears against a collar 60 mounted upon the rod in the usual manner. Withdrawal of the rod from the clip is prevented by means of a nut 61 which bears against the underside of the clip 58, as shown in Fig. 1. When thrust is imparted to the rod, it will be transmitted through the clip on the drag bar, thereby providing the necessary pressure to force the shovels into the ground to the desired degree, as is customary in implements of this kind.

The upper end of each pressure rod 57 is hooked into the rear end of a bifurcated bell crank lever 62. The construction of this lever is clearly shown in Fig. 5, in which it will be seen that the lever consists of two companion sections which merge together at their rear ends 63, and are elsewhere spaced apart and held in spaced relation by means of a spacer block 64 provided, on its opposite sides, with square lugs 65 which are entered through square holes 66 in the adjacent lever walls and held in fixed relation therewith by employment of cotter pins 67.

The bell crank, as a whole, is pivoted at or near its angle upon a pivot pin or bolt 68 which is entered through the side walls 69 of a pivot mounting 70 bolted or otherwise secured to the rear rail of the frame.

The rearwardly extending arm of the bell crank which connects with the pressure rod 57 is longer than the upstanding end, which latter is provided with slots 68$^a$ in its side walls and within the lever, and adjacent to the slots therein is located an adjustable pivot block 69$^a$ which is adapted to be longitudinally adjusted by means of the right and left adjusting screw 70$^a$, the upper end of which is entered through the spacer block 64 and terminates in a handle 71. By rotating the handle, the right and left threads on the shank of the screw will simultaneously cause the screw, as a whole, to move longitudinally within the spacer block 64 and at the same time cause the adjustable pivot block 69$^a$ to ride upon the adjusting screw, so that a very quick and easy adjustment of the pivot block may be effected.

The pivot block serves as a mounting for the bifurcated head 72 of a link 73, the forward end of which is pivoted to an arm 74 depending from a squared rock shaft 75, the ends and intermediate portions of which are journaled within brackets 76 secured to the front rail of the main frame and extending inwardly therefrom. The rock shaft is adapted to be rocked by means of a hand lever 77 rigidly secured at its forward end to the shaft, which lever coöperates with the customary segmental rack 78 to hold the squared rock shaft in properly adjusted position.

Fig. 5 shows the parts in the position in which they are when the gangs are lowered in the ground for cultivating. In this position, it will be noted that the link 73 occupies an obliquely angular relation with respect to the upper arm of the bell crank, and with the parts thus disposed, up and down adjustment of the pivot block 69ª will materially alter the angle of the bell crank as a whole, and thereby materially change the vertical adjustment of the rod 57, so that with the bell crank thrown in lowered position to force the shovels into the ground, a material variation in the vertical relation of the several sets of shovels can be effected by turning the several adjusting screws to the desired degree.

When, however, the gangs are simultanously elevated by a depression of the hand lever and a turning of the rock shaft 75, the respective links 73, irrespective of the individual regulation of the several adjusting screws, will all stand in substantially right-angular relation with respect to their coöperating bell cranks, so that, with the simultaneous lifting of the several gangs, the mechanism heretofore described will automatically act to level the respective gangs and bring them all into substantial alinement with one another, irrespective of variations in their respective positions when lowered.

In order to afford a mounting for the rear ends of the steering shaft and controlling rods, an upstanding bracket 79 is provided which is secured at its base to one of the rails of the seat beam. This bracket, at its upper end 80, is forked to provide three upstanding arms which afford suitable mountings for a steering shaft 81 and controlling levers 82 which connect with suitable rods 83 extending to the engine of the tractor and serving to control the various working parts thereof. The details of these controlling devices, however, form no portion of the present invention, and need not be further described.

In order to assist in the lifting of the several gangs, a pair of heavy coiled springs 84 are provided, the rear ends of which are suitably secured to the rear rail of the frame by means of bolts 85 or the like, while the forward end of each spring is secured to a bowed link 86 of inverted U-shape, the forward end of which is pivoted to a bowed inverted arm 87 extending upwardly and forwardly from the squared rock shaft 75, the parts being so disposed that, when the rock shaft is turned forwardly in position to swing the arms 74 rearwardly and thereby exert a thrust on the links 73, the bowed link 86 will be drawn forward by the movement of the bowed arm 87 with which it is connected, thereby putting the spring 84 under tension as the gangs are lowered, with the result that sufficient power will be thus stored up in the springs to assist in the lifting of the gangs as occasion may require.

In cases where it is desired to employ the cultivator as a horse-drawn implement, it is desirable to provide connections between the gang bar 40 and the ground wheel mountings, so that the ground wheels will be angled in conformity with the lateral shifting of the gang bar. Suitable connections for this purpose are illustrated in Fig. 7. In this construction, each of the wheel standards 88 is swiveled to a bracket 89 secured to and outwardly projecting from the corresponding end of the rear rail of the frame, and the upper end of each standard is squared and entered into a square socket 90 in the rear end of an arm 91, which arm coöperates with a diagonal brace bar 92 secured to the standard at a point below the bracket 89 and having its forward end united with the arm 91. The united forward ends of the arm and the brace bar are spread to provide a yoke 93, the members of which are provided with slots 94 to receive pins 95 projecting vertically from a collar 96 on the end of the gang bar.

A spacing block or washer 97 is interposed on the vertical portion of the wheel standard between the lower end of the bracket 89 and the rear end of the brace bar 92, and the parts are held against spreading by means of a tie rod 98, which arrangement affords a connection rigid against rotational movement between the arm 91 and the wheel standard, so that as the gang bar is swung laterally to adjust the positions of the gangs, the wheel standards will be swiveled and the ground wheels angled in a direction corresponding to the lateral shifting of the gangs. This causes the entire implement to steer laterally to a degree commensurate and complementary with the lateral shifting of the gangs, so that it will be easily possible to move the gangs into a position to cultivate around hills or plants which are out of check as the same are encountered. In using horses, this angling of the wheels is desirable, in that it supplements the lateral movement of the gangs and relieves the operator from the necessity of endeavoring to turn the machine by the action of the horses which might result in the trampling down of the rows ahead of the cultivator, but where a tractor is employed in close and intimate relation to the cultivator, it is desirable to hold the wheels in fixed relation to the cultivator frame and rely upon the steering of the implement as a whole, effected by angling the tractor beam and attached cultivator with respect to the tractor unit.

In operation, with the cultivator connected to the tractor beam by means of the widely spaced front and rear longitudinal pivots, the entire implement will be strongly held against vertical thrust and at the same time will possess the necessary flexibility in respect to tilting or rocking to easily adapt itself to inequalities in the ground without rocking or unduly straining the implement as a whole. Since the cultivator is maintained at all times in fixed vertical relation with respect to the tractor unit, the steering wheel and operating levers will occupy a position in fixed relation to the driver's seat which, it will be noted, occupies a position considerably to the right of the center of the tractor, so that the operator will have an unimpaired view of the right hand row under cultivation and can guide the implement accordingly.

When a hill is encountered which is out of check, either to the right or left of the row under cultivation, the gang bar can be readily shifted and all of the gangs will be moved to a position to clear the misplaced hill, and thereafter immediately returned to normal position to continue its operations in alinement with the row under cultivation. This method of swinging the gang bar is highly efficient, in that friction is reduced to a minimum and the bar is so hung that it will respond easily and readily to the manipulation of the foot treadles and at the same time will return to normal center position by action of gravity.

The method of leveling the gangs when in elevated position is highly desirable, in that it permits the raising and lowering operations to be effected by the use of a single hand lever and at the same time brings the shovels when elevated to a substantially uniform level, so that the danger of interference with trash or the like is reduced to a minimum.

Theoretical exactness in the designing of the bell cranks would indicate the provision of slots in the side walls of the bell cranks slightly curved on a radial length equal to the length of the link member 73 when standing in right radial relation to the slot.

Theoretical exactness would also indicate the use of a rocking block 64, carried by trunnions instead of squared lugs like the lug 65. These refinements, however, have not been attempted for the reason that in implements of this class exact precision is not required and the mechanisms shown and described are sufficiently accurate for all practical purposes.

Although the invention has been described with considerable detail, it is not the intention unless otherwise indicated to limit the claims to the precise structure shown.

I claim:

1. In a cultivator, the combination of a frame, a gang bar hung beneath the frame, gangs supported at the forward ends by the gang bar, and means for imparting endwise movement to the gang bar to adjust the gangs in a lateral direction, substantially as described.

2. In a cultivator, the combination of a transversely elongated frame, a gang bar positioned beneath the forward portion of the frame, pivotal supporting means for the gang bar, means for laterally swinging said means to impart endwise movement to the gang bar, and gangs secured at their forward ends to the gang bar and adapted to be laterally shifted by the movement thereof, substantially as described.

3. In a cultivator, the combination of a transversely elongated frame, a gang bar positioned beneath the forward portion of the frame, pivotal supporting means for the gang bar, foot-operated means for laterally swinging said means to impart endwise movement to the gang bar, and gangs secured at their forward ends to the gang bar and adapted to be laterally shifted by the movement thereof, substantially as described.

4. In a cultivator, the combination of a transversely elongated frame, hangers depending from the forward portion of the frame and provided with rearward extensions in angular relation to the hangers, a gang bar supported by the hangers, means for rocking one of the hanger extensions to impart a swinging movement to the hangers and endwise movement to the gang bar, and gangs supported at their forward ends from the gang bar and movable therewith to afford lateral adjustment, substantially as described.

5. In a cultivator, the combination of a transversely elongated frame, hangers depending from the forward portion of the frame and provided with rearward extensions in angular relation to the hangers, a gang bar supported by the hangers, foot-operated means for rocking one of the hanger extensions to impart a swinging movement to the hangers and endwise movement to the gang bar, and gangs supported at their forward ends from the gang bar and movable therewith to afford lateral adjustment, substantially as described.

6. In a cultivator, the combination of a laterally elongated frame embodying front and rear rails, wheel standards connected to the rear rail and wheels journaled to the standards, hangers depending from the front rail and provided with rearward extensions journaled to the front and rear rails of the frame, a gang bar pivotally supported by the hangers, means for rotating one of the extensions to swing the hangers and impart endwise swinging movement to the gang bar, and gangs embodying drag bars secured at their forward ends to the gang bar, substantially as described.

7. In a cultivator, the combination of a laterally elongated frame embodying front and rear rails, wheel standards connected to the rear rail and wheels journaled to the standards, hangers depending from the front rail and provided with rearward extensions journaled to the front and rear rails of the frame, a gang bar pivotally supported by the hangers, gangs embodying drag bars secured at their forward ends to the gang bar, arms outwardly projecting from one of the hanger extensions, and foot treadles connected with said arms for rotating said extension, and imparting a swinging movement to the hangers and endwise swinging movement to the gang bar for the purpose of laterally adjusting the gangs, substantially as described.

8. In a cultivator, the combination of a frame, a plurality of gangs each embodying a drag bar pivoted at its forward end to the frame, pressure rods upwardly extending from the rear portions of the respective drag bars, and leveling means comprising devices for individually adjusting the level of each of the gangs when lowered, and comprising connections for substantially leveling the individually adjusted gangs when raised.

9. In a cultivator, the combination of a frame, a plurality of gangs each embodying a drag bar pivotally supported at its forward end from the frame, pressure rods upwardly extending from the rear portions of the respective drag bars, and leveling means comprising devices for individually adjusting the level of each of the gangs when lowered, and comprising a connection for each of the adjusting means, and a device for simultaneously operating all of the connections for simultaneously raising and leveling all of the gangs irrespective of their individual adjustments, substantially as described.

10. In a cultivator, the combination of a frame, a plurality of gangs each embodying a drag bar pivotally supported at its forward end from the frame, pressure rods connected at their lower ends with the respective drag bars, a lever element for each of the pressure rods for raising and lowering the same, a link for each of the lever elements adjustably connected with respect thereto, and means common to all of the links for operating the same in unison, the structure being one which serves to substantially level all of the gangs when raised irrespective of their individual vertical adjustments when lowered, substantially as described.

11. In a cultivator, the combination of a frame, a plurality of gangs each embodying a drag bar pivotally supported at its forward end from the frame, a pressure rod upwardly extending from each of the drag bars, a bell crank lever for each of the pressure rods to the rear arm of which the rod is attached, a link adjustably connected to the companion arm of each bell crank lever, and means for simultaneously operating all of said links, the parts being arranged to bring the gangs to a substantially uniform level when raised, and permitting the individually adjusted gangs to assume varying levels when lowered, substantially as described.

12. In a cultivator, the combination of a frame, a plurality of gangs each embodying a drag bar pivotally supported at its forward end from the frame, a pressure rod for each of the drag bars upwardly extending therefrom, a pivotally mounted bell crank lever for each of the pressure rods consisting of an upwardly extending arm and a rearwardly extending arm, to which latter the pressure rod is attached, and means for pivoting each bell crank near its bend or angle, a pivot block adjustably carried by the upwardly extending arm of each bell crank, means for adjusting said pivot block, a link pivoted to each of the pivot blocks, and hand-operated means for simultaneously operating all of the links, substantially as described.

13. In a cultivator, the combination of a frame, a plurality of gangs each embodying a drag bar pivotally supported at its forward end from the frame, a pressure rod for each of the drag bars upwardly extending therefrom, a pivotally mounted bell crank lever for each of the pressure rods consisting of an upwardly extending arm and a rearwardly extending arm, to which latter the pressure rod is attached, and means for pivoting each bell crank near its bend or angle, a pivot block adjustably carried by the upwardly extending arm of each bell crank, means for adjusting said pivot block, a link pivoted to each of the pivot blocks, and hand-operated means for simultaneously operating all of the links, the relation of the parts being such that the links will occupy an oblique relation to the upstanding bell crank arms when the gangs are in lowered position, and will assume a substantially right angular relation with respect to the upstanding arms when the gangs are in raised position, whereby the individual adjustments of the respective pivot blocks will materially affect the level of the gangs when lowered without materially affecting their level when raised, substantially as described.

14. In a cultivator, the combination of a frame, a plurality of gangs each embodying a drag bar pivotally supported at its forward end from the frame, a pressure rod connected with and upstanding from each of the drag bars, a bell crank for each pressure rod pivoted to the frame and comprising an upstanding arm and a rearwardly extending arm, to which latter the pressure rod is pivotally connected, means for pivoting each of the bell cranks at or near its bend, the upstanding arm of each bell crank being bifurcated, and a pivot block slidable within the bifurcated upper arm of each bell crank, an adjusting screw for regulating the position of each of the pivot blocks, a link connected with each of the pivot blocks, a rock shaft with which the several links are connected, and a hand lever for rocking the shaft to impart movement to all of the links simultaneously, the relation of the parts being such that the links will extend in an oblique relation to their respective bell crank arms when the bell cranks are adjusted to lowered position, and will stand in substantially right angular relation with said arms when the bell cranks are in raised position, so that the individual adjustments of the several pivot blocks will serve to adjust the level of the respective gangs when lowered, but will not materially affect the level of the gangs when raised, substantially as described.

HARRY S. DICKINSON.